US010706297B2

(12) United States Patent
Quaggin-Mitchell et al.

(10) Patent No.: US 10,706,297 B2
(45) Date of Patent: *Jul. 7, 2020

(54) MANAGEMENT OF PARKING SPACES

(71) Applicant: International Business Machines Corporation, Armonk, NY (US)

(72) Inventors: Rebecca Quaggin-Mitchell, Botley (GB); Fenglian Xu, Hampshire (GB); David J. Nice, Hampshire (GB); Doina L. Klinger, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 163 days.

This patent is subject to a terminal disclaimer.

(21) Appl. No.: 15/709,529

(22) Filed: Sep. 20, 2017

(65) Prior Publication Data

US 2019/0087669 A1  Mar. 21, 2019

(51) Int. Cl.
| | | |
|---|---|---|
| *G06K 9/00* | (2006.01) | |
| *G06K 9/32* | (2006.01) | |
| *G07B 15/06* | (2011.01) | |
| *G08G 1/14* | (2006.01) | |
| *G06Q 10/02* | (2012.01) | |

(Continued)

(52) U.S. Cl.
CPC ..... *G06K 9/00812* (2013.01); *G06K 9/00771* (2013.01); *G06K 9/325* (2013.01); *G06Q 10/02* (2013.01); *G07B 15/06* (2013.01); *G08G 1/141* (2013.01); *G08G 1/142* (2013.01); *G08G 1/146* (2013.01); *G08G 1/148* (2013.01); *G06F 17/18* (2013.01); *G07B 15/02* (2013.01)

(58) Field of Classification Search
CPC ........ G08G 1/142; G08G 1/146; G08G 1/148; G08G 1/141; G06K 9/325; G06K 9/00812; G06F 17/18; G07B 15/06

See application file for complete search history.

(56) References Cited

U.S. PATENT DOCUMENTS 6,642,854 B2  11/2003  McMaster
7,783,530 B2 *  8/2010  Slemmer .............. G06Q 10/087
                                                    705/28

(Continued)

FOREIGN PATENT DOCUMENTS

CN  102163375 A  8/2012
WO  2011003674 A1  1/2011

(Continued)

OTHER PUBLICATIONS

Quaggin-Mitchell et al., "Management of Parking Spaces", U.S. Appl. No. 15/813,205, filed Nov. 15, 2017, 32 pages.

(Continued)

*Primary Examiner* — Pinalben Patel
(74) *Attorney, Agent, or Firm* — Stephanie L. Carusillo

(57) ABSTRACT

Management of parking spaces in a parking area comprising a plurality of zones. A ticket is provided to an individual associated with a vehicle parked in the parking area, and the ticket is associated with the vehicle. Also, a first zone in which the vehicle is parked is identified. Responsive to the individual validating the ticket, it is determined that the vehicle associated with the ticket will be leaving the identified first zone, and there is provided an indication that a parking space of the identified first zone is to become available.

11 Claims, 5 Drawing Sheets

(51) Int. Cl.
*G06F 17/18* (2006.01)
*G07B 15/02* (2011.01)

(56) References Cited

U.S. PATENT DOCUMENTS

| | | | |
|---|---|---|---|
| 9,483,944 | B2 | 11/2016 | Bahgat et al. |
| 9,557,741 | B1 | 1/2017 | Elie et al. |
| 2008/0048885 | A1 | 2/2008 | Quinn |
| 2009/0315738 | A1 | 12/2009 | Falk et al. |
| 2012/0092189 | A1 | 4/2012 | Jordan |
| 2013/0166333 | A1 | 6/2013 | Chang et al. |
| 2014/0036076 | A1 | 2/2014 | Nerayoff et al. |
| 2014/0340241 | A1* | 11/2014 | Smart, Jr. ............. G08G 1/142 340/932.2 |
| 2016/0086488 | A1* | 3/2016 | Bahgat ................. G08G 1/146 340/932.2 |
| 2016/0328971 | A1 | 11/2016 | Nakhjavani |
| 2016/0358473 | A1* | 12/2016 | Scofield ............... G08G 1/141 |
| 2017/0278311 | A1* | 9/2017 | Vespia ................. G07B 15/02 |
| 2017/0301149 | A1 | 10/2017 | Shafran |
| 2019/0087670 | A1* | 3/2019 | Quaggin-Mitchell ..................... G08G 1/142 |
| 2019/0122449 | A1* | 4/2019 | Rosas-Maxemin .... G07B 15/02 |

FOREIGN PATENT DOCUMENTS

| | | | |
|---|---|---|---|
| WO | 2016066350 | A1 | 5/2016 |
| WO | 2016200883 | A1 | 12/2016 |

OTHER PUBLICATIONS

IBM, List of Patent Applications Treated As Related, "Appendix P", Dated Nov. 15, 2017, 2 pages.

Ioannou et al., "Intelligent Driver Assist System for Urban Driving", 2016 Digital Media Industry & Academic Forum (DMIAF), 2016, IEEE Conference Publications, pp. 128-134, <http://ieexplore.ieee.org/abstract/document/7574917>.

Lan et al., "An intelligent driver location system for smart parking" Expert Systems with Applications, vol. 41, Issue 5, Apr. 2014, pp. 2443-2456, <http://www/sciencedirect.com/science/article/pii/S0957517413007987>.

Tiedemann et al., "Concept of a Data Thread Based Parking Space Occupancy Prediction in a Berlin Pilot Region", Artificial Intelligence for Transportation: Advice, Interactivity and Actor Modeling: Papers from the 2015 AAAI Workshop, Association for the Advancement of Artificial Intelligence, 6 pages.<www.aaai.org>.

"ANPR (automatic number plate recognition) parking system", Printed Sep. 15, 2017, 3 pages, <http://www.parkeon.co.uk/our-solutions/product-catalogue/anpr-parking-system/>.

"Off Street Parking Management—Parkeon", Printed Sep. 15, 2017, 2 pages, <http://www.parkeon.co.uk/our-solutions/product-catalogue/off-street-parking-management/>.

"The app that opens barriers", Shoppping Centre, Published Sep. 29, 2014, Printed Aug. 29, 2017, 2 pages, <http://www.shopping-centre.co.uk/news/fullstory.php/aid/7587/The_app_that_opens_barriers_html>.

Suhr et al., "Sensor Fusion-Based Vacant Parking Slot Detection and Tracking", IEEE Transactions on Intelligent Transportation Systems, IEEE Journals and Magazines vol. 15, Issue 1, pp. 21-36.

* cited by examiner

MANAGEMENT OF PARKING SPACES

BACKGROUND

The present invention relates to the field of parking area management, and more particularly to management of parking spaces in a parking area.

A parking area (i.e., parking lot, car park, parking garage, car lot, etc.) is typically a cleared area that is intended for parking vehicles. Parking areas can be of many varying sizes, and can be intended for use by varying types of vehicles (e.g., cars, bicycles, motorcycles, industrial vehicles, etc.). Depending on a location or an intended use, use of a parking area can be free of charge, or require payment of a fee.

Many instances of parking areas require payment of a fee utilize a ticketing or validation system. Upon entry to a parking area, an individual in a vehicle can obtain a ticket (e.g. from an attendant or an automated ticketing system). In an example, the ticket can indicate the time that the vehicle entered the parking area. Before exiting the parking area, the individual pays a required fee (e.g., to the attendant or the automated ticketing system) corresponding to the amount of time the vehicle has been parked in the parking area. The ticket may then be validated (or exchanged for an exit voucher, ticket, token or the like) so as to permit the vehicle to leave the parking area.

To assist in finding a free parking space in a parking area, some parking areas provide a system for indicating whether parking spaces are free/available. If such a system indicates that parking area is full or nearly full, a driver of a vehicle can end up driving around the parking area trying to identify a free space, which can cause frustration and waste fuel.

SUMMARY

Aspects of an embodiment of the present invention disclose a method for management of parking spaces in a parking area comprising a plurality of zones, in which each zone comprises one or more parking spaces. The method comprises providing a ticket to an individual associated with a vehicle parked in the parking area and associating the ticket with the vehicle associated with the individual. The method further comprises identifying a first zone in which the vehicle is parked. Responsive to the individual validating the ticket, the method further comprises determining that the vehicle associated with the ticket will be leaving the identified first zone. The method further comprises providing an indication that a parking space of the identified first zone is to become available.

Aspects of another embodiment of the present invention disclose a computer program product for management of parking spaces in a parking area comprising a plurality of zones, in which each zone comprising one or more parking spaces. The computer program product comprises a computer readable storage medium having program instructions embodied therewith, wherein the program instructions are executable by a processing unit to cause the processing unit to perform a method comprising: providing a ticket to an individual associated with a vehicle parked in the parking area; associating the ticket with the vehicle associated with the individual; identifying a first zone in which the vehicle is parked; responsive to the individual validating the ticket, determining that the vehicle associated with the ticket will be leaving the identified first zone; and providing an indication that a parking space of the identified first zone is to become available.

Aspects of yet another embodiment of the present invention disclose a system for management of parking spaces in a parking area comprising a plurality of zones, in which each zone comprising one or more parking spaces. The system comprises a ticketing system adapted to provide a ticket to an individual associated with a vehicle parked in the parking area and to associate the ticket with the vehicle associated with the individual. The system also comprises a vehicle identification unit adapted to identify a first zone in which the vehicle is parked. The system further comprises a parking management unit adapted to, responsive to the individual validating the ticket, determine that the vehicle associated with the ticket will be leaving the identified first zone, and to provide an indication that a parking space of the identified first zone is to become available.

DETAILED DESCRIPTION

Figure 1:
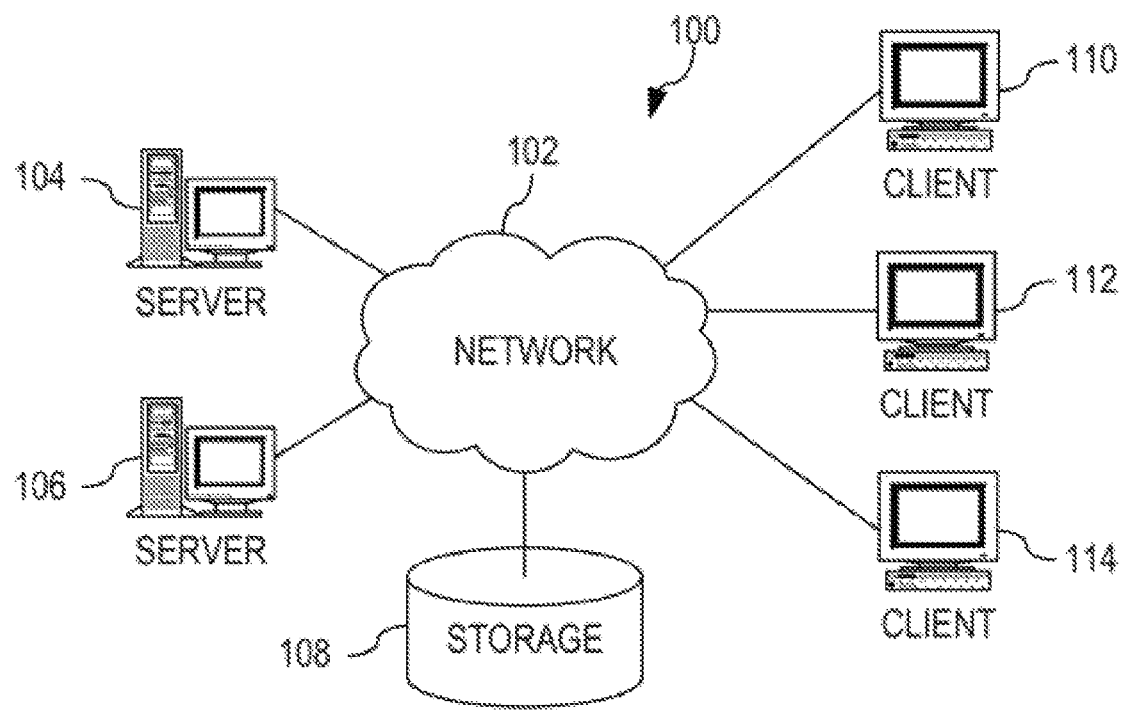
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Embodiments of the present invention provide an approach for preempting when a parking space in a parking area is to become available. By identifying when a parking ticket is validated (e.g. when a fee associated with the ticket is paid, or when the ticket is presented to an attendant or validation system), embodiments of the present invention infer that a parking space, such as that being occupied by a vehicle of a vehicle user who has validated the parking ticket, will become available within a reasonably short time period following the time of ticket validation. In other words, responsive to the vehicle user validating a parking ticket, embodiments of the present invention determine when a vehicle will be leaving the parking area, and thus, determine when a parking space will become available.

For example, by associating a parking ticket with a vehicle and identifying a zone or area within which the vehicle is parked, embodiments of the present invention determine that a parking space within the identified zone or area will become available shortly after the parking ticket associated with that vehicle is validated. This may, in turn, enable an indication to be generated, wherein the indication communicates the area or zone in which a parking space is predicted to become available, and this may be done prior to the parking space actually becoming available (i.e., in the timeframe following validation of the parking ticket but before the vehicle leaves its parking space). Proposed embodiments advise users (e.g., individuals or vehicles entering the parking area) where in the parking area a parking space will shortly become available (e.g., within the next few minutes).

In this way, effective prediction of a parking space becoming available is based on linking a parking ticket with a vehicle and then monitoring when the parking ticket is validated. Further, by identifying where the vehicle is parked (either roughly to within a sub-area or zone of the parking area, or accurately to within an individual parking space), embodiments of the present invention predict where in the parking area a parking space will become available shortly after the parking ticket is validated. By predicting where the parking space will become available, an indication can be provided, so as to direct a waiting vehicle towards the predicted zone or parking space.

Proposed embodiments therefore preemptively identify parking spaces that will become available. Such embodiments need not wait for a parking space to actually become available (e.g. be vacated by a vehicle). Instead, embodiments of the present invention infer that a parking space is expected to become available within a predicted timeframe (such as a time window of less than 10 minutes, less than 5 minutes, or less than 2 minutes) following validation (e.g. payment, stamping, processing, etc.) of a parking ticket.

For instance, and simply by way of example only, by linking when a parking ticket has been validated or paid with a parking area, embodiments of the present invention notify other vehicle users (e.g. by using signage) that a vehicle is due to leave a parking space within a certain predicted timeframe (say 5 or 10 minutes) negating a need for these other vehicle users to aimlessly drive around the parking area searching for a parking space.

Further, some embodiments monitor and/or track vehicle positions in a zoned parking area, which may be done in conjunction with associating parking tickets with vehicles. In this way, responsive to a parking ticket being validated (e.g. a fee associated with the parking ticket being paid), proposed embodiments infer that the vehicle associated with the parking ticket will be vacating its parking space (within the zone it was monitored/tracked to) and an indication may then be provided to another vehicle that a parking space of a particular zone/area of the parking area will become available. Waiting and/or entering vehicles may thus be guided to zones of the parking area where parking spaces are predicted to shortly become available prior to the spaces actually being available (i.e. vacated).

Further, based on the monitored and/or tracked vehicle positions, some embodiments identify a zone in which the vehicle is parked. Other embodiments identify a parking space in which the vehicle is parked. Embodiments provide an indication that the identified parking space is to become available. In this way, indications or predictions relating to individual or single parking spaces can be provided, and this may then enable the provision of accurate indications or directions to a specific parking space to be provided. This may further reduce or limit a need for another vehicle to drive around the parking area (or a zone of the parking area) searching for a parking space or space that is to become available.

In some embodiments, identifying a first zone in which the vehicle is parked involves utilizing images or video received from one or more image capture devices adapted to capture images or video of the parking area. For example, an embodiment of the present invention processes the images or video in accordance with a vehicle registration plate recognition algorithm (such as an Automatic Number Plate Recognition (ANPR) process). In this way, embodiments may implement known image/video analysis or processing concepts for identifying, tracking or monitoring vehicles. Such image/video analysis or processing concepts may be widely used and have extensive and/or powerful identification and tracking capabilities that may be leveraged by proposed concepts. Embodiments may therefore be implemented using existing technologies that may be cheaply and/or widely available, thus reducing associated difficulties and/or costs.

In some embodiments, providing an indication is based on a statistical model. Such a statistical model, for example, provides a probability of a departure time of a vehicle from the parking area. For instance, a probabilistic model that is based upon parking locations, ticket validation location, and/or travel times and/or speeds of vehicle users may be employed. Thus, a prediction engine utilizes statistical modeling software to create a statistical model based on parking area data. In an embodiment, for a validated parking ticket associated with a vehicle parked in the parking area, a prediction engine utilizes statistical modeling software to create an instance of a statistical model based on vehicle location data. The statistical model may be based on historical data (e.g., previous journey or departure times for vehicle users that parked in the same location) associated with vehicle location data. Further, in an embodiment, the statistical model is stored in a storage device and associated with a corresponding instance of vehicle data. In this way, a parking space prediction engine may utilize a statistical model to determine probabilities of a departure time of a vehicle from the parking area relative to a validation time of a parking ticket associated with the vehicle. For example, when a parking ticket associated with a vehicle parked in a first zone of the parking area is validated, the statistical model may indicate that there is an 85% probability that the vehicle will leave its parking space after ten minutes (based on previous timeframes taken for vehicles parked in the first zone to depart the parking area following ticket validation).

Proposed embodiments comprise obtaining an indication of a location at which the parking ticket was validated. Providing an indication may then be based on a location of the identified first zone relative to the location at which the parking ticket was validated. In this way, embodiments may take account of a distance between the vehicle and vehicle user when the parking ticket is validated, thus enabling a time taken for the vehicle user to reach the vehicle to be estimated and accounted for in predicting a time at which the vehicle will vacate its parking space. Accurate indications of when a parking space is to become available may therefore be provided by proposed embodiments.

Embodiments of the present invention track the movement of the vehicle within the parking area using conventional vehicle tracking concepts, image/video capture processing, radio frequency identification tag monitoring, etc., so as to identify a zone in which the vehicle is parked. Such information about the vehicle's whereabouts within the parking area is then used for providing an indication as to where a parking space is predicted to become available when it is determined that the vehicle will be leaving (i.e. vacating its parking space).

Accordingly, embodiments of the present invention provide an approach to extend parking area management systems such that empty/available parking spaces may be pre-emptively identified (i.e. predicted) before they are actually vacated by a vehicle. Different ways to identify when a parking space may become available may be employed by embodiments, and these may be implemented in isolation or in combination. Embodiments of the present invention propose modifications and additional steps to a traditional (parking area) management systems, which enhance the value and utility of the proposed concepts.

Illustrative embodiments may be utilized in many different types of vehicle parking environments. Illustrative embodiments may, for example, be employed in relation to multi-story car parks (i.e. buildings designed for car parking and where there are a number of floors or levels on which parking spaces are provided) or street parking utilizing a pay/validate by phone system.

Figure 2:
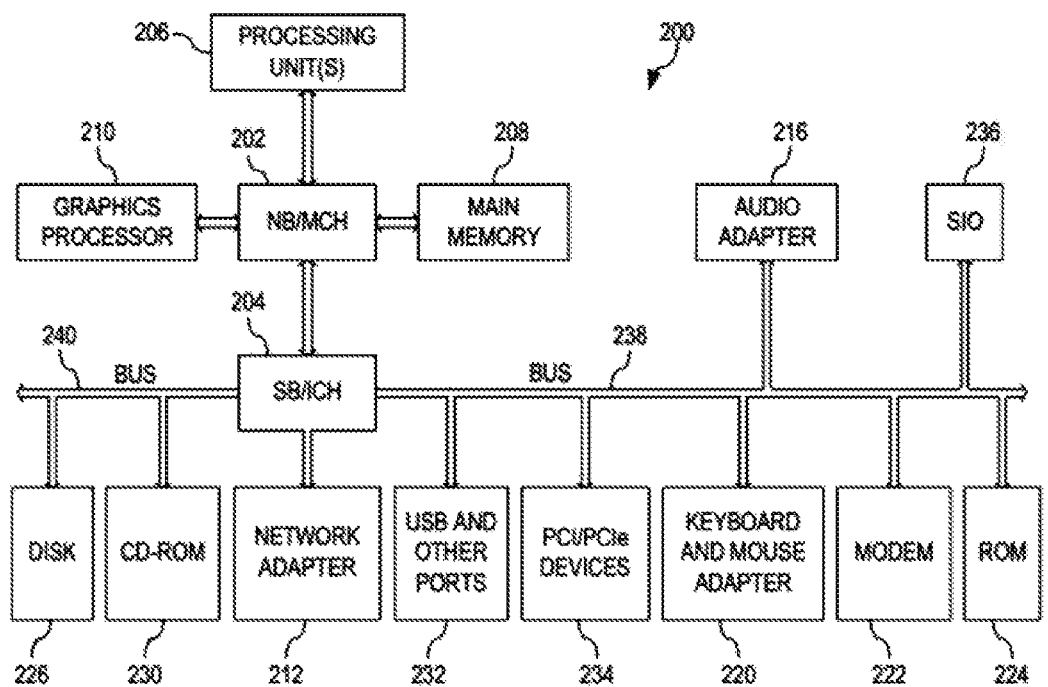
FIG. 2 depicts a block diagram of an example system in which aspects of the illustrative embodiments may be implemented.

Illustrative embodiments may be utilized in many different types of data processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. Distributed data processing system 100 contains at least network 102, which is the medium used to provide communication links between various devices and computers connected together within distributed data processing system 100. Network 102 may include connections, such as wire, wireless communication links, or fiber optic cables.

In the depicted example, server 104 and server 106 are connected to network 102 along with storage unit 108. In addition, clients 110, 112, and 114 are also connected to network 102. Clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. System 200 is an example of a computer, such as client 110 in FIG. 1, in which computer usable code or instructions implementing the processes for illustrative embodiments of the present invention may be located.

In the depicted example, system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through second bus 240. HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on processing unit 206. The operating system coordinates and provides control of various components within system 200 in FIG. 2. As a client, the operating system may be a commercially available operating system. An object-oriented programming system, such as the JAVA™ programming system, may run in conjunction with the operating system and provides calls to the operating system from JAVA™ programs or applications executing on system 200.

As a server, system 200 may be, for example, an IBM® eServer™ System p® computer system, running the Advanced Interactive Executive (AIX®) operating system or the LINUX® operating system. System 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or main memory 208.

The processes for illustrative embodiments of the present invention may be performed by processing unit 206 using computer usable program code, which may be located in a memory such as, for example, main memory 208, ROM 224, or in one or more peripheral devices, such as HDD 226 and CD-ROM 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, system 200 may take the form of any of a number of different data processing systems including client computing devices, server computing devices, a tablet computer, laptop computer, telephone or other communication device, a personal digital assistant (PDA), or the like. In some illustrative examples, system 200 may be a portable computing device that is configured with flash memory to provide non-volatile memory for storing operating system files and/or user-generated data, for example. Thus, system 200 may essentially be any known or later-developed data processing system without architectural limitation.

Embodiments of the present invention enhance a parking area management system by identifying when a parking space is to become available prior to a vehicle actually vacating the parking space.

Embodiments of the present invention pre-empt the vacating of a parking space before the parking space is vacated by a vehicle. By associating a parking ticket or token with a vehicle and identifying a location of the vehicle, embodiments of the present invention infer that a vehicle associated with a parking ticket or token will shortly leave the identified rough/approximate location when the parking ticket is validated (e.g. a tariff associated with the ticket is paid). An indication may then be provided (e.g. to other un-parked vehicles within the parking area) that a space is to become available within the identified rough/approximate location. Such proposals can improve, manage or reduce vehicle movement within in a parking area.

Figure 3:
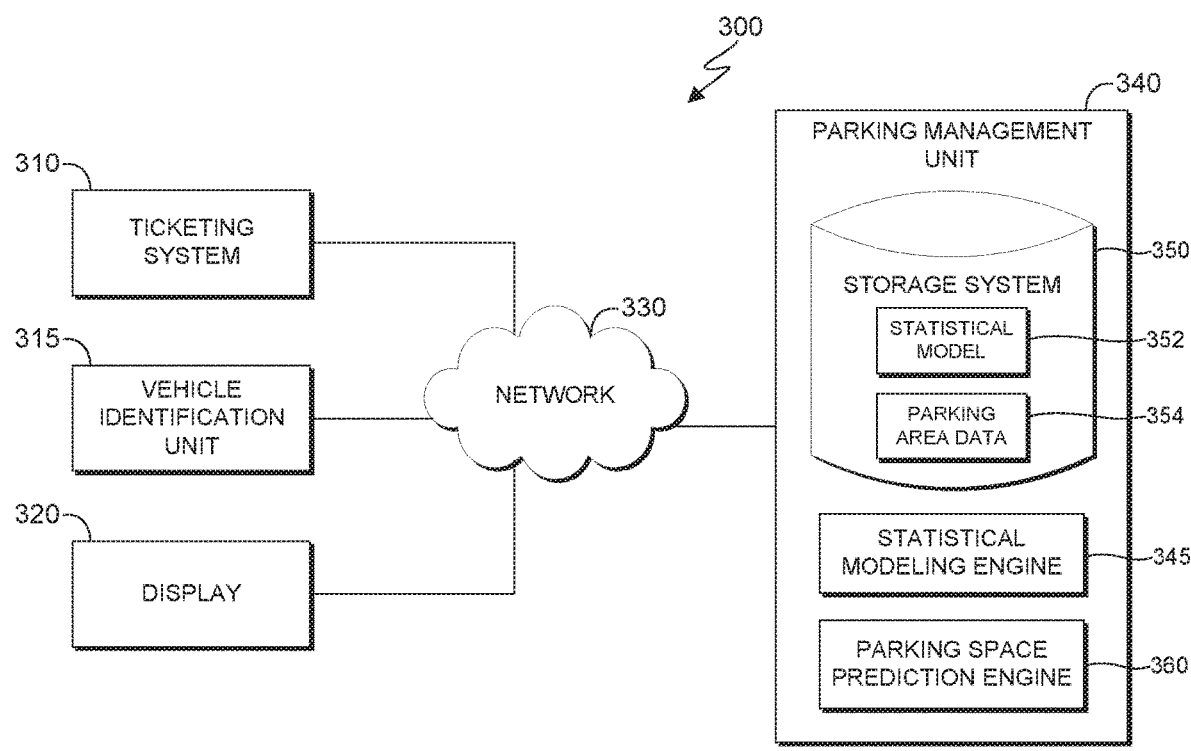
FIG. 3 depicts a simplified block diagram of a system for management of parking spaces in a parking area according to an embodiment.

Referring to FIG. 3, a simplified block diagram of system 300 for management of parking spaces in a parking area is depicted, according to an embodiment of the present invention. In this example embodiment, the parking area that system 300 manages comprises a plurality of different zones, wherein each zone comprises a plurality of parking spaces.

In the depicted embodiment, system 300 comprises ticketing system 310, vehicle identification unit 315, parking management unit 340, and display 320. Ticketing system 310, vehicle identification unit 315, parking management unit 340, and display 320 are connected via network 330 using suitable wired or wireless communication links.

Ticketing system 310 is adapted to provide a parking ticket (or token) to a vehicle user (e.g., driver) associated with a vehicle parked in the parking area. In doing so, ticketing system 310 associates (e.g., links) the parking ticket with the vehicle associated with the vehicle user. Information/data relating to the parking ticket and its associated vehicle is provided to parking management unit 340 via network 330.

Vehicle identification unit 315 is adapted to identify a zone within which the vehicle associated with parking ticket is parked. For this purpose, vehicle identification unit 315 is adapted to utilize images or video received from one or more image capture devices that are adapted to capture images or video of the parking area. For example, vehicle identification unit 315 may process the images or video in accordance with a vehicle registration plate recognition algorithm, so as to track movement of the vehicle within the parking area. Using such visual tracking and/or monitoring concepts, vehicle identification unit 315 may not only identify a zone within which the vehicle associated with parking ticket is parked, but may actually identify an individual parking space in which the vehicle is parked. Information/data relating to the identified location of the vehicle is provided from vehicle identification unit 315 to parking management unit 340 via network 330.

Responsive to the vehicle user validating the parking ticket, parking management unit 340 is adapted to determine that the vehicle associated with the parking ticket will be leaving the identified zone and/or individual parking space. Parking management unit 340 is adapted to provide an indication that a parking space of the identified zone/parking space is to become available. In the depicted embodiment, the indication is a visual indication provided by display 320, and so parking management unit 340 communicates with display 320 (via network 330) to direct display 320 to display an indication (e.g. message) for communicating that a parking space of the identified zone is to become available.

In more detail, parking management unit 340 is adapted to provide the indication based on a statistical model. Such a statistical model provides a probability of a departure time of a vehicle from the parking area. For instance, a probabilistic model that is based upon parking locations, ticket validation location, and/or travel times and/or speeds of vehicle users may be employed. Parking space prediction engine 360 of parking management unit 340 may thus utilize statistical modeling engine 345 to create statistical model 352 based on parking area data 354, wherein statistical model 352 and parking area data 354 are stored in data storage system 350 of parking management unit 340.

For a validated ticket associated with a vehicle parked in the parking area, parking space prediction engine 360 may utilize statistical modeling engine 345 to create an instance of a statistical model, such as statistical model 352, based on parking area data and an identified parking location of the vehicle. Such a statistical model may be based on historical parking area data (e.g., previous departure timeframes—or time delays between ticket validation and parking space vacation—for vehicles parked in the same location) associated with the parking location. Statistical model 352 is stored in data storage system 350 and associated with a corresponding instance of parking location data. In this way, parking space prediction engine 360 utilizes a statistical model to determine probabilities of a departure time of a vehicle from the parking area relative to a validation time of a ticket associated with the vehicle.

For example, when a parking ticket associated with a vehicle parked in a first zone (e.g., Zone A) of the parking area is validated, statistical model 352 may indicate that there is a 95% probability that the vehicle will leave its parking space after ten minutes, based on parking area data 354 including previous timeframes taken for vehicles parked in the first zone to depart the parking area following ticket validation.

Figure 4:
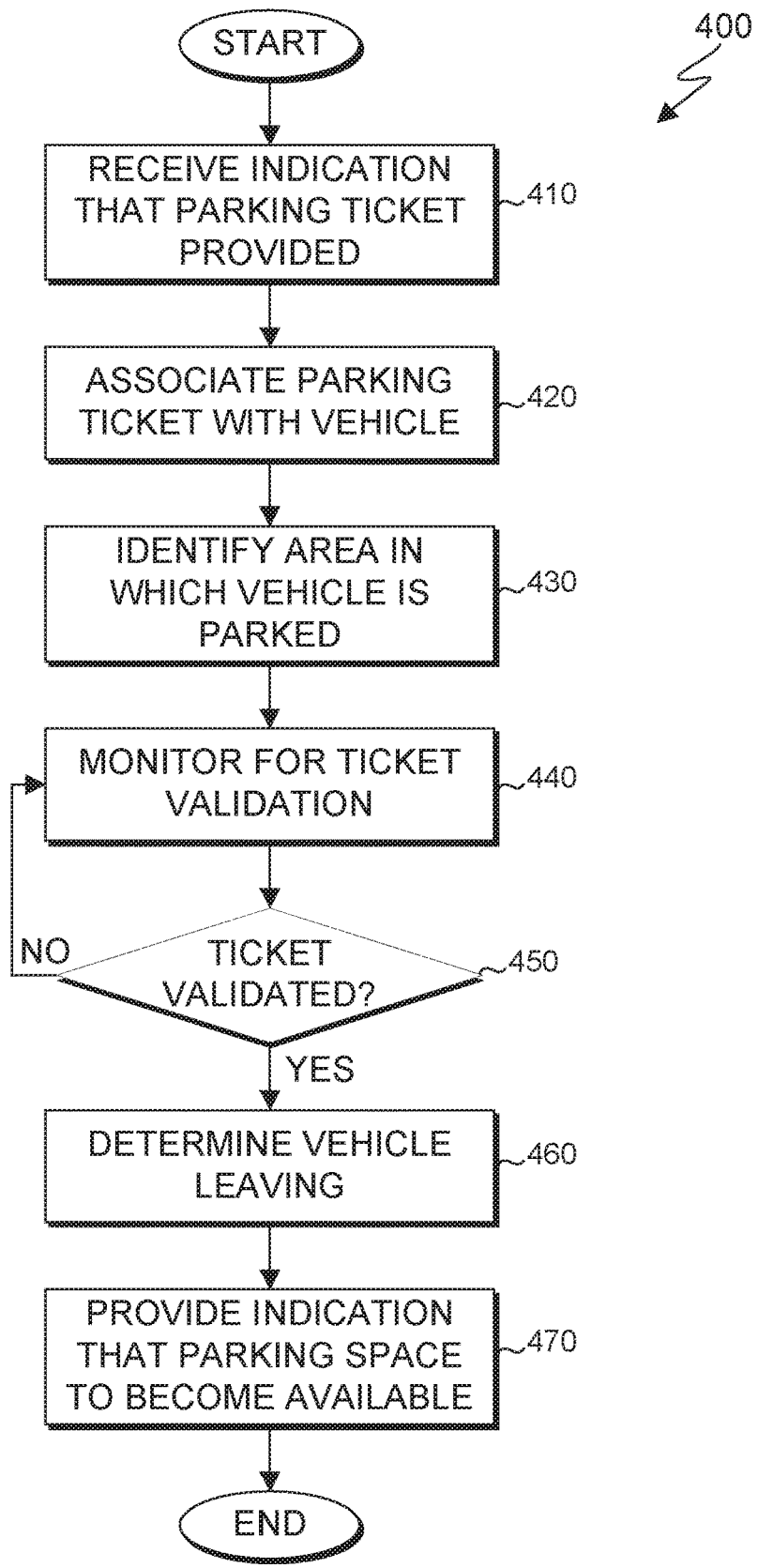
FIG. 4 illustrates a flow diagram of a parking management program according to an embodiment.

Referring now to FIG. 4, a simplified flow diagram 400 of parking management unit 340 for management of parking spaces in a parking area comprising a plurality of zones is depicted, according to an embodiment.

In step 410, parking management unit 340 receives an indication from ticketing system 310 that a parking ticket (or token/voucher) has been provided to a vehicle user associated with a vehicle that is parking in the parking area. In step 420, parking management unit 340 associates the parking ticket with the vehicle (associated with the vehicle user).

In step 430, parking management unit 340 identifies an area in which the vehicle is parked. Here, parking management unit 340 utilizes images or video received from one or more image capture devices adapted to capture images or video of the parking area in order to identify and track movement of vehicles within the parking area. Vehicle movement may thus be automatically tracked and monitored in step 430 so as to identify an individual parking space in which the vehicle is parked. Also, to assist such vehicle tracking and parking space identification, parking management unit 340 may employ known parking space monitoring concepts (such the use of IR or light sensors in parking spaces to identify vehicle occupancy of parking spaces), thereby improving tracking/monitoring accuracy and/or reliability.

In other embodiments, it is noted that the step 430 of identifying an area in which the vehicle is parked may be undertaken separately (e.g. before) in steps 410 and 420. Indeed, in some embodiments, parking management unit 340 may track vehicle movement and determine a parking location prior to a parking ticket being issued/provided to a driver of the vehicle. In these embodiments, the location of vehicle associated with a parking ticket may already be known at the time of issuing the ticket.

In step 440, parking management unit 340 monitors for validation of the parking ticket. If, in decision 450, parking management unit 340 determines that the parking ticket has not yet been validated, parking management unit 340 returns to step 440, wherein monitoring for ticket validation is continued/repeated.

If, in decision 450, parking management unit 340 determines that the parking ticket has been validated, parking management unit 340 continues to step 460, wherein, responsive to the parking ticket being validated, parking management unit 340 determines that the vehicle associated with the parking ticket will be leaving the identified parking space in which the vehicle is parked. In an embodiment, parking management unit 340 makes this determination by inferring that a parking space, such as that being occupied by the vehicle of the vehicle user who has validated the parking ticket, will become available within a predicted timeframe (such as a time window of less than 10 minutes, less than 5 minutes, or less than 2 minutes) following validation (e.g. payment, stamping, processing, etc.) of a parking ticket. In other words, responsive to the vehicle user validating a parking ticket, parking management unit 340 determines when the vehicle will be leaving the parking area, and thus, determines when a parking space will become available. In step 470, parking management unit 340 provides an indication that the identified parking space is to become available.

From the above-described embodiments, it will be appreciated that there may be proposed the concept of identifying and/or tracking vehicle positions in a zoned parking area (such as a car park for example) in conjunction with linking parking tickets to vehicles. Then, by detecting an individual validating a parking ticket (e.g. paying an associated fee), it may be inferred that the vehicle linked to parking ticket will soon be leaving the parking area. Knowing the parking location of the vehicle, an indication may then be provided (e.g. to other persons or vehicles in the parking are) that a space will soon become available at (or in) the location of the vehicle linked to the validated ticket. A vehicle seeking a parking space in the parking area may thus be directed to an area or location containing a parking space that will soon become available, and this may be done prior to the parking space actually becoming available.

Embodiments may thus improve or assist management of parking spaces of a parking area by providing additional, accurate and/or timely information about the parking spaces that are about to become available. This may enable better use of time for parking area users and/or reduce fuel consumption and $CO_2$ emissions associated with vehicles searching for a parking space.

By way of further example, an implementation of an embodiment will now be summarized in the context of a car park that is split into zones that are monitored using an automated number plate recognition system. Here, the car park is a multi-story car park comprising a plurality of levels, wherein each level is a different zone. Steps of the embodiment may be summarized as follows:

(I) When a car enters the car park, its number plate is identified using a camera and a uniquely associated parking ticket is generated.

(II) The car then parks in an available parking space on level 2 of the car park (i.e. in Zone 2).

(III) Number plate recognition (NPR) cameras are used through the car park, sited in a way that they are able to track cars entering and leaving each zone. A computer keeps track of which cars are in which zone. At the point where the driver of a car can make a decision as to whether to enter a zone or move to a next zone, an electronic sign is provided showing an estimate of currently free spaces, and in an estimate of spaces becoming free in the next few minutes. By tracking cars in each zone (using the NPR cameras) it is known which cars enter and exit each zone, and it is also known how many parking spaces are free in each zone (e.g. if one assumes that if a car is in a zone it is occupying a parking space).

(IV) A computer and database keeps track of which cars are in which zones.

(V) An estimate of spaces becoming free in the next few minutes is then generated by monitoring vehicle users paying for their parking using the uniquely associated parking ticket. When a vehicle user pays for their parking (i.e. validates their parking ticket by putting their parking ticket into a machine), information about the vehicle associated with the parking ticket is retrieved (e.g. form a data store of a computer system). Inferring that the vehicle uniquely associated with the parking ticket will be leaving in the near future, and knowing the location (e.g. zone) where the vehicle is parked, a "spaces becoming free" count for that location/zone can then been incremented (until it is detected that the vehicle as left the location/zone, at which point "a spaces free" count can be incremented and the "spaces becoming free" count decremented).

Figure 5:
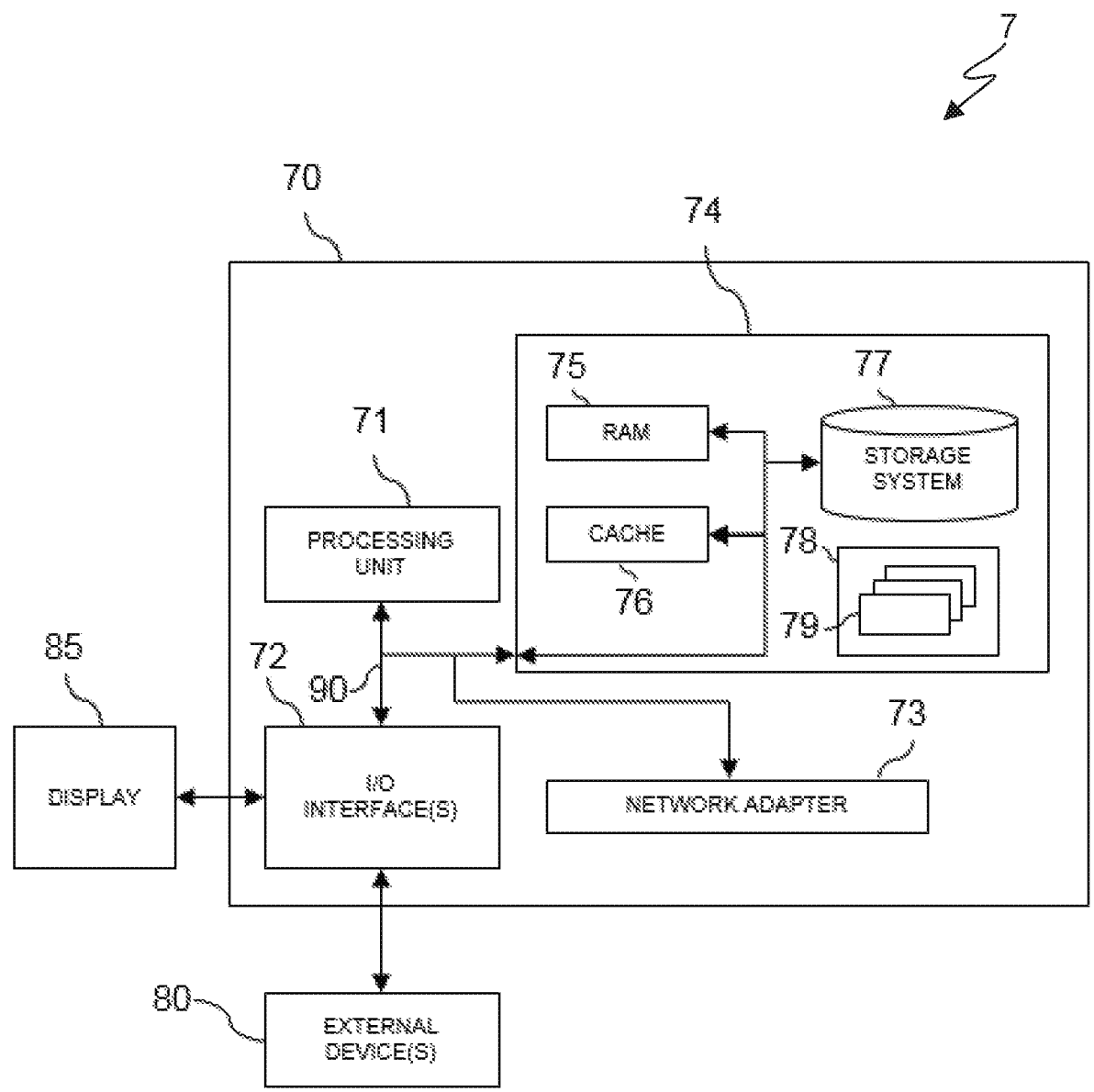
FIG. 5 illustrates a system for parking area management according to an embodiment.

As illustrated in FIG. 5, embodiments may comprise a computer system/server 70, which may form part of a networked system 7. The components of computer system/server 70 may include, but are not limited to, one or more processing arrangements, for example comprising processors or processing units 71, system memory 74, and bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, system memory 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in system memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, display 85, etc.; one or more devices that enable a user to interact with computer system/server 70; and/or any devices (e.g., network card, modem, etc.) that enable computer system/server 70 to communicate with one or more other computing devices. Such communication can occur via input/output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for management of parking spaces, the computer program product comprising a non-transitory computer readable storage medium having program instructions embodied therewith, wherein the program instructions are executable by a processing unit to cause the processing unit to perform a method comprising:
   providing a ticket to an individual associated with a vehicle parked in a parking area, wherein the parking area comprises a plurality of zones and each zone comprises one or more parking spaces;
   associating the ticket with the vehicle associated with the individual;
   identifying a first location in which the vehicle is parked, wherein the first location is within a first zone of the parking area;
   responsive to the individual validating the ticket at a second location at a first time, determining that the vehicle associated with the ticket will be leaving the first zone at a second time based on a distance between the individual validating the ticket at the second location and the vehicle parked at the first location, wherein the second time is subsequent in time to the first time; and
   providing an indication at a third time that a parking space of the first zone is to become available at the second time, wherein the second time is subsequent in time to the third time.

2. The computer program product of claim 1, wherein:
   identifying the first location in which the vehicle is parked comprises identifying a first parking space in which the vehicle is parked; and
   providing the indication comprises providing the indication that the identified first parking space is to become available.

3. The computer program product of claim 1, wherein identifying the first location in which the vehicle is parked comprises utilizing at least one of images and video received from one or more image capture devices adapted to capture at least one of images and video of the parking area.

4. The computer program product of claim 3, wherein utilizing the at least one of images and video comprises processing the at least one of images and video in accordance with a vehicle registration plate recognition algorithm.

5. The computer program product of claim 1, wherein providing the indication is based on a statistical model, wherein the statistical model provides a probability of a departure time of the vehicle from the parking area.

6. The computer program product of claim 1, wherein identifying the first location in which the vehicle is parked comprises tracking movement of the vehicle within the parking area.

7. A computer system for management of parking spaces, the computer system comprising:
- one or more computer hardware processors;
- one or more non-transitory computer readable storage media;
- program instructions stored on the non-transitory computer readable storage media for execution by at least one of the one or more computer hardware processors, the program instructions comprising:
  - program instructions to provide a ticket to an individual associated with a vehicle parked in a parking area, wherein the parking area comprises a plurality of zones and each zone comprises one or more parking spaces;
  - program instructions to associate the ticket with the vehicle associated with the individual;
  - program instructions to identify a first location in which the vehicle is parked, wherein the first location is within a first zone of the parking area;
  - responsive to the individual validating the ticket at a second location at a first time, program instructions to determine that the vehicle associated with the ticket will be leaving the first zone at a second time based on a distance between the individual validating the ticket at the second location and the vehicle parked at the first location, wherein the second time is subsequent in time to the first time; and
  - program instructions to provide an indication at a third time that a parking space of the first zone is to become available at the second time, wherein the second time is subsequent in time to the third time.

8. The computer system of claim 7, wherein:
- the program instructions to identify the first location in which the vehicle is parked comprise program instructions to identify a first parking space in which the vehicle is parked; and
- the program instructions to provide the indication comprise program instructions to provide the indication that the identified first parking space is to become available.

9. The computer system of claim 7, wherein the program instructions to identify the first location in which the vehicle is parked comprise program instructions to utilize at least one of images and video received from one or more image capture devices adapted to capture at least one of images and video of the parking area.

10. The computer system of claim 9, wherein the program instructions to utilize the at least one of images and video further comprise program instructions to process the at least one of images and video in accordance with a vehicle registration plate recognition algorithm.

11. The computer system of claim 7, wherein the program instructions to provide the indication is based on a statistical model, wherein the statistical model provides a probability of a departure time of the vehicle from the parking area.

\* \* \* \* \*